Patented Aug. 5, 1947

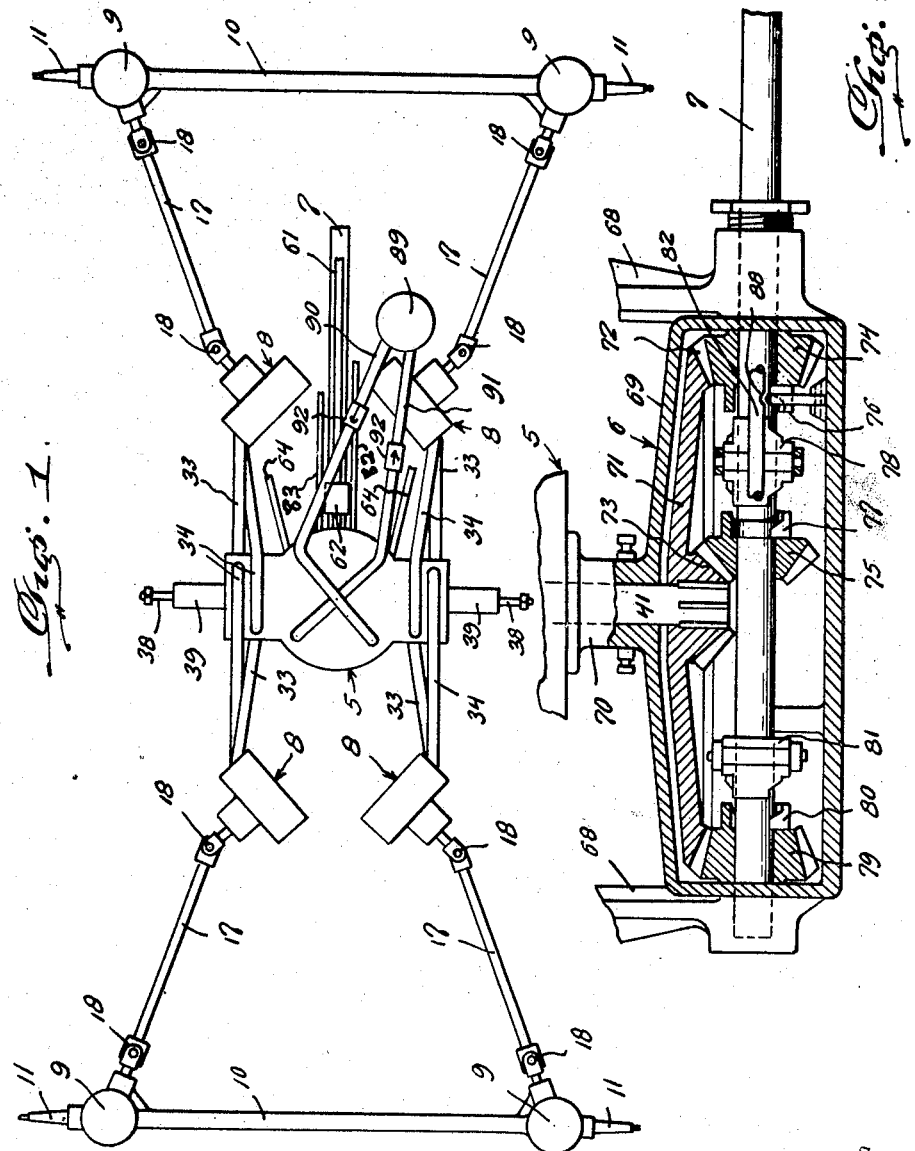

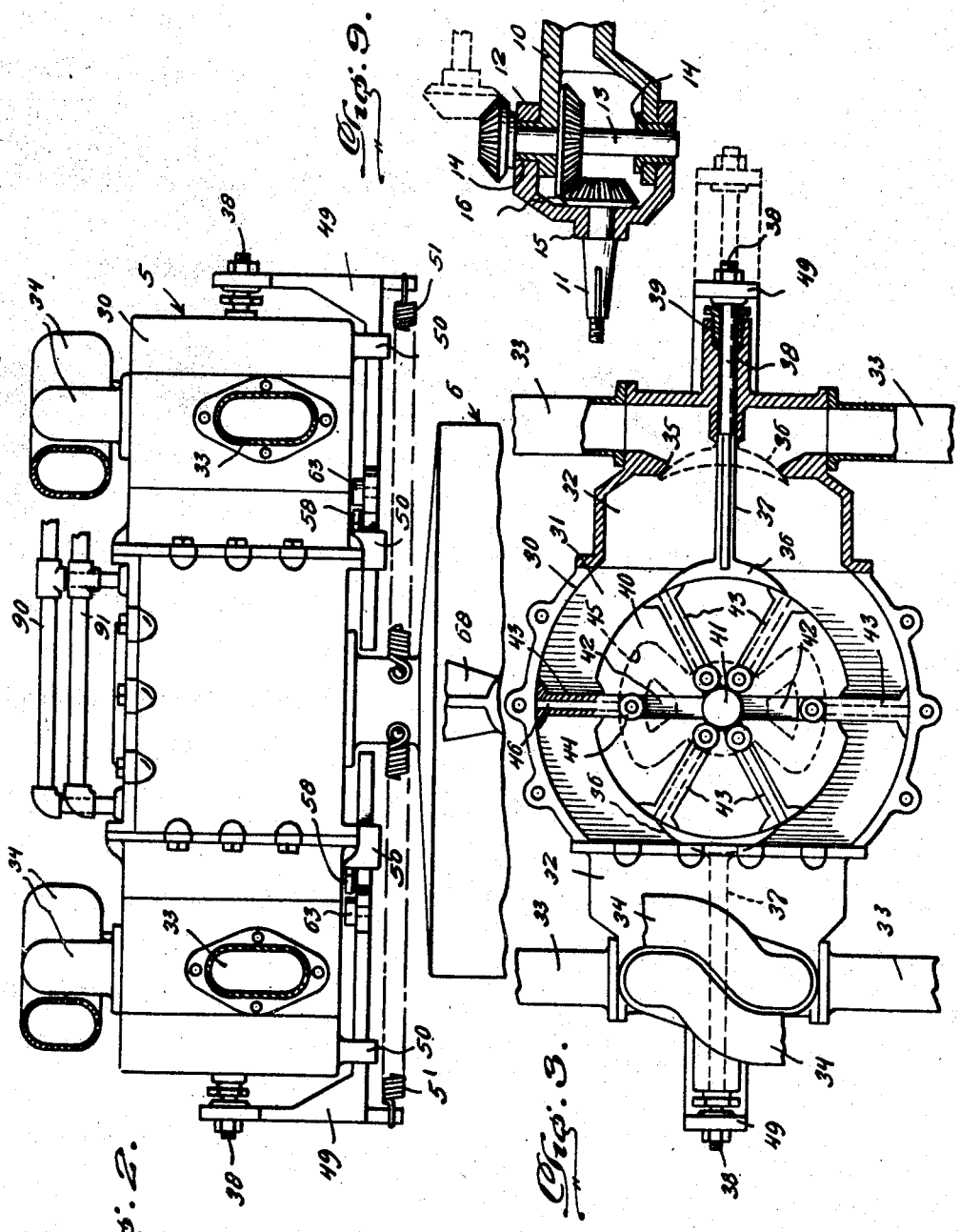

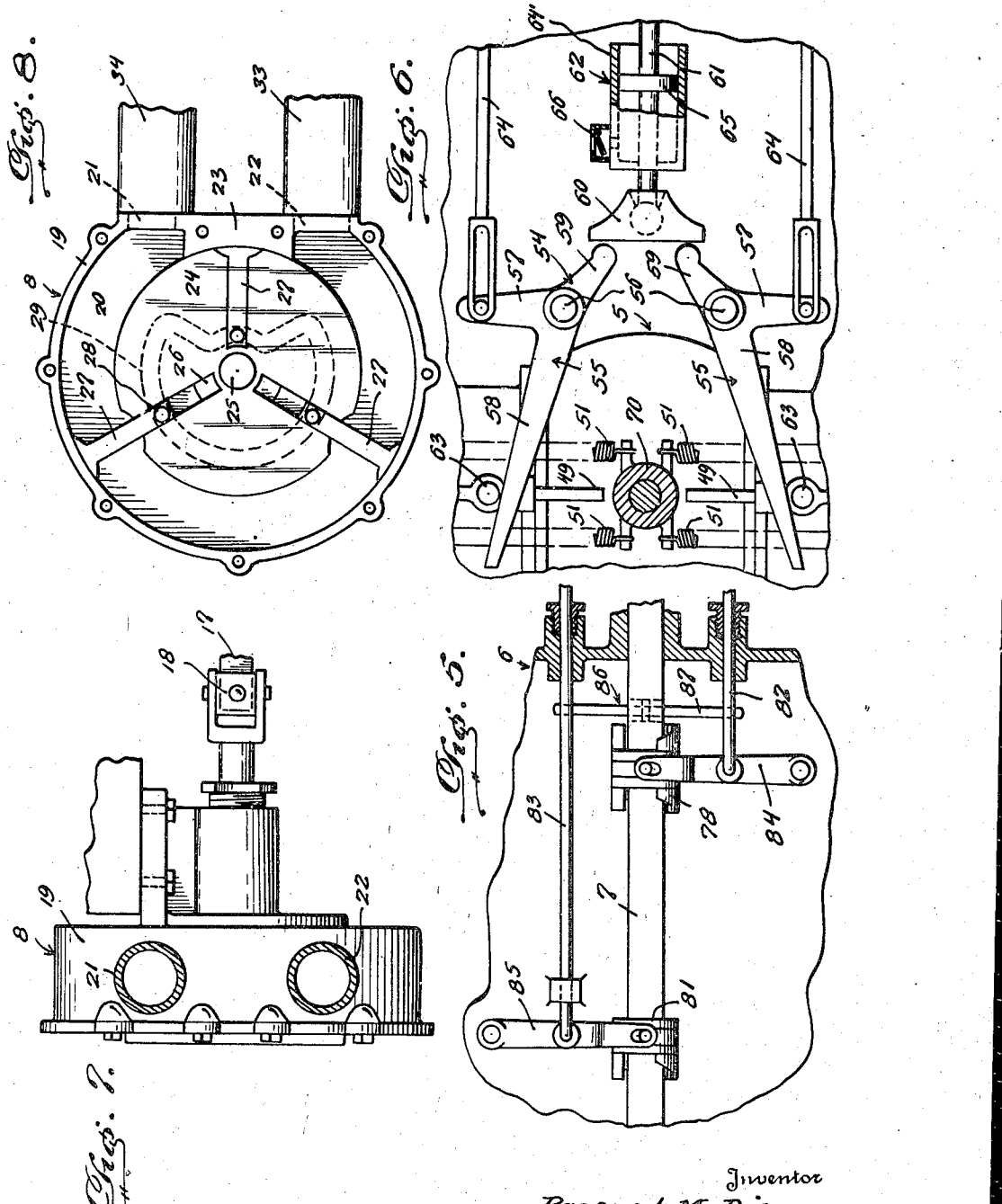

2,425,089

UNITED STATES PATENT OFFICE 2,425,089

FLUID DRIVE OR TRANSMISSION

Pascual M. Diaz, San Antonio, Tex.

Application January 13, 1944, Serial No. 518,139

3 Claims. (Cl. 180—66)

This invention relates to a fluid drive between wheels of a vehicle and the prime mover of said vehicle.

The primary object of the invention is the provision of a device of the above stated character which will be extremely smooth in operation and easy to control and includes fluid driven units for the wheels of the vehicle and a fluid drive unit connected to the prime mover by a variable speed and reverse transmission for driving the driven units simultaneously or in pairs and to interrupt the driving of the wheels at the will of the operator, permitting the wheels to run free of the prime mover or to permit the prime mover to operate free of the wheels while the latter stands idle and is capable of braking the wheels as desired through the retarding of the flow of fluid between said drive and driven units.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a diagrammatical view illustrating a fluid drive for a vehicle or similar device constructed in accordance with my invention.

Figure 2 is a side elevation, partly in section, illustrating the fluid drive unit.

Figure 3 is a horizontal sectional view illustrating the drive unit.

Figure 4 is a fragmentary longitudinal sectional view illustrating the variable speed and reverse transmission.

Figure 5 is a fragmentary horizontal sectional view illustrating the clutches and operating means therefor of the variable speed and reverse transmission.

Figure 6 is a fragmentary bottom plan view, partly in section, illustrating a portion of the control mechanism for the gates or valves of the fluid drive unit.

Figure 7 is an edge elevation, partly in section, illustrating one of the fluid driven units.

Figure 8 is a fragmentary plan view of one of the fluid driven units with the cover plate removed.

Figure 9 is a fragmentary sectional view illustrating one of the steering knuckles for the wheel axle.

Referring in detail to the drawings, the numeral 5 indicates in entirety the fluid drive unit, 6 the variable speed and reverse transmission connected thereto and its power shaft 7 is adapted to be connected to a suitable prime mover of the vehicle. The fluid driven elements comprising a set of four of such elements are indicated in entirety by the character 8 and are symmetrically arranged about the fluid drive unit 5 and are operatively connected to combined steering and drive knuckles 9 of axles 10 of the vehicle. The wheel spindles of the combined steering and drive knuckles 9 are indicated by the character 11 and to which are secured the usual vehicle wheels (not shown).

Each combined steering and drive knuckle 9 includes a forked portion 12 (see Figure 9) mounted for pivotal movement on the axles 10 through the use of a king bolt 13. The king bolt is mounted in bearings 14 so that it may rotate relative to the axle 10 and the forked portion 12. The forked portion includes a journal 15 which rotatably supports the axle spindle 11. Beveled gears 16 connect the spindle 11 to the king bolt 13. Also the king bolt 13 is geared to a propeller shaft 17.

In this invention there are four propeller shafts 17 including universal joints 18 (see Figure 1). The propeller shafts are connected to the fluid driven units 8. The universal joints 18 compensate for movement between the axles 10 and the fluid driven units 8. In other words, the fluid driven units 8 are suitably mounted on the frame of the vehicle while the axles 10 as of the conventional construction are free to move upwardly and downwardly with respect to the frame of the vehicle.

Each fluid driven unit 8 (see Figures 7 and 8) consists of a housing 19 having a rotor chamber 20 provided with intake and outlet ports 21 and 22 with an abutment 23 arranged in the chamber 20 between said ports to contact the periphery of a rotor 24 adapted for rotation within said chamber 20. The rotor 24 is secured to a shaft 25 journaled in the housing 19 and this shaft is connected to one of the propeller shafts 17. The rotor 24 is provided with radially arranged guide slots 26 which open outwardly through opposite side faces of the rotor as well as the periphery thereof for slidably supporting blades 27 adapted to be moved inwardly and outwardly in a radial respect to the shaft 25 by rollers 28 carried by said blades operating in a cam groove 29 formed in the housing 19. The cam groove 29 is of such shape that the blades 27 will be moved inwardly to permit said blades to pass the abutment 23 and then outwardly for wiping contact with the housing 19.

Thus it will be seen that fluid pressure entering the intake port 21 will act on the blades to rotate the rotor 24 and pass from the housing by way of the outlet port 22. By the same token, it is obvious that if fluid is entered through the outlet port 22 and exhausted through the intake port 21 the rotor 24 will be rotated reversely.

The fluid drive unit includes a housing 30 (see Figures 2 and 3) provided with a rotor chamber 31 and fluid chests 32 in direct communication with the rotor chamber. The fluid chests have connected thereto inlet and outlet pipes 33 and 34. Seats 35 are arranged between the inlet pipes and the chests 32 to be engaged by valve elements 36 forming part of gates 37 slidably mounted in the chests 32 and each includes a rod 38 extending exteriorly of the chests through a stuffing gland 39. By reference to Figure 3 it will be seen that the chests 32 are arranged opposite to each other, also the gates 37, and that the valve elements 36 are of arcuate shape so that they may have wiping contact with the periphery of a rotor 40 rotatably mounted in the rotor chamber 31 of the housing 30. The rotor 40 is secured to a shaft 41 journaled in the housing 30 and which has one end extending exteriorly of the housing 30 to enter the variable speed and reverse transmission 6.

The rotor 40 is provided with radially arranged guide slots 42 in which are slidably mounted blades 43 equipped with rollers 44 operating in a cam groove 45 of the housing 30 to bring about inward and outward movement of the blades with respect to the rotor so that the blades may have wiping contact with walls of the housing 30 and to be moved inwardly of the rotor when opposite the valve elements of the gates 37. The blades 43 are provided with passages 46 extending from end to end thereof so that fluid may pass through said blades during their inward and outward movements and thereby cut down fluid resistance to said blades during said movements.

The gates 37 are slidably mounted so that the valve elements 36 may be moved toward and from the periphery of the rotor and when positioned inward to have wiping contact with the periphery of the rotor, brings about operation of the fluid drive unit to actuate the fluid driven units 8. However, as the gates are moved away from the rotor, the fluid then may pass between the gates and the rotor reducing the fluid driving force from the unit 5 on the units 8 and when the valve elements 36 of the gates are positioned substantially midway between the periphery of the rotor 40 and the seats 35 the full amount of fluid may then bypass the gates and thereby stop driving action on the driven units 8.

When the gates are slid to their furthest position away from the periphery of the rotor 40, the valve elements 36 contact the seats 35 and cut off fluid circulation between the unit 5 and the driven units 8 bringing about a full braking action on the wheels of the vehicle. However, it will be seen that as the valve elements approach the seats 35 the fluid circulation between the unit 5 and the units 8 is gradually retarded so as to bring about the gradual application of the braking action on the wheels.

Substantially L shaped arms 49 are detachably and adjustably connected to the rods 38 of the gates 37 and are slidably supported in guides 50 carried by the housing 30. Coil springs 51 are connected to the arms 49 and act to urge the gates 37 in the direction of the periphery of the rotor 40. The springs 51 are connected to the housing 30.

The inlet pipes 33 of the fluid drive unit 5 are connected to the outlet ports 22 of the driven units 8 and the outlet pipes 34 of the fluid drive unit 5 are connected to the inlet ports 21 of said driven units 8. By referring to Figure 1 it will be seen that the inlet and outlet pipes 33 and 34 of the fluid drive unit 5 are so arranged that they will connect one of the chests 32 to a pair of driven units 8 on one side of the vehicle while the other pair of driven units 8 at the other side of the vehicle will be connected to the other chest 32 of the fluid drive unit 5. With this arrangement it is possible for the fluid drive unit to actuate the driven units 8 simultaneously or to actuate either pair of driven units 8 while the other pair of driven units is idle. This is accomplished through the alternate operation of the gates 37 with respect to the rotor 40, it being understood that when both gates 37 are positioned to have wiping contact with the rotor 40 the driven units 8 will be simultaneously operated by the fluid drive unit 5. The movement of one gate away from the rotor 40 to a midway position between the seat 35 and the rotor will cut out the drive to one pair of driven units 8 while the other pair of driven units 8 is operated by the fluid drive unit 5. A reverse operation of the gates from that described will bring about driving of the other pair of driven units while the other pair of driven units will be non-driven by the fluid drive unit 5.

An operating means 54 is carried by the housing 30 of the fluid drive unit 5 for the operation of the gates 37 as heretofore described and consists of bell crank levers 55 pivotally mounted, as at 56. The bell crank levers include short arms 57 and long arms 58 and extensions 59 arranged in converging relation to be engaged by a head 60 of a shaft 61 forming a part of a dashpot 62. The long arms 58 engage rollers 63 carried by the arms 49 connected with the rods of the gates. Operating rods 64 have pin and slot connections with the short arms 57. The operating rods 64 are adapted to be independently operated with respect to each other whereby the operator may actuate either one of the gates. The operation of the gates simultaneously is brought about through the movement of the shaft 61 of the dash pot 62, it being understood that the shaft 61 may be connected to a foot pedal. The purpose of the dashpot 62 is to slow up the movement of the gates or valve elements thereof toward the seats 35 so as to bring about a gradual braking action on the wheels of the vehicle. The dashpot 62 is so arranged that the initial movement of the rod 61 may be rapid to move the gates away from the periphery of the rotor 40 rather rapidly until the valve elements of the gates assume substantially midway position between the rotor and the seat 35 which is the idling position and on further operation of the gates to bring about movement of the valve elements thereof toward the seats, the dashpot 62 acts so as to prevent too sudden applying of the braking action on the wheels of the vehicle.

By referring to Figure 6 it will be seen that the dashpot 62 includes a cylinder 64' which is closed at one end and said end slidably supports the rod 61. A piston head 65 is secured to the rod and moves into and out of the cylinder by the operation of the brake pedal. On the initial movement of the brake pedal the piston head is outwardly of the cylinder and enters said cylinder on the gates moving into idling position or with the valve elements thereof positioned substantially midway between the rotor 40 and the seats 35. The piston head on entering the cylinder has its movement checked through a conventional valve mechanism 66 of the dashpot 62 so that the movement of the gates or the valve elements thereof further toward the seats will be more gradual to effect the gradual braking action on the wheels. The valve mechanism 66 may include a quick acting inlet valve to admit air to the cylinder as the piston 65 moves in a direction outwardly of the cylinder and a slow acting valve to check or gradually permit the escape of pressure on the inward movement of the piston head of the cylinder 64. The valve mechanism 66 may be in the form of a flat type valve element, as shown in Figure 6, which will permit a rapid flow of air into the cylinder 64′ on the piston 65 moving in an outward direction and will seat on a reverse movement of the piston 65 and has small ports permitting a gradual flow of air from the cylinder on the movement of the piston in the last mentioned direction. With further reference to Figure 6, it will be seen that the bell crank levers 55 may be simultaneously operated by the brake pedal without affecting the operating rods 64 due to the pin and slot connections between the bell crank levers and said operating rods.

Hangers 68 are connected to the frame of the vehicle and rotatably support the power shaft 7 of the prime mover (not shown, because it is conventional and obvious) and which in turn supports the housing 69 of the transmission unit 6. The housing 69 also may be secured to the housing 30 of the unit 5 by a bearing 70 which rotatably supports the shaft 41 of the rotor 40 and which shaft enters the housing 69 of the transmission unit 6.

Splined to the end of the shaft 41 located in the housing 69 of the transmission unit 6 is a ring gear 71 having groups of teeth 72 and 73. The teeth 72 and 73 are of the beveled type to mesh with beveled gears 74 and 75 journaled on the power shaft 7 within the housing 69. A clutch element 76 forms a part of the beveled gear 74 and a clutch element 77 forms a part of the beveled gear 75. The clutch elements 76 and 77 are arranged in opposed relation and spaced from each other. The teeth 72 of the ring gear 71 meshing with the beveled gear 74 provides one gear ratio while the teeth 73 of the ring gear 71 meshing with the gear 75 provides another gear ratio. Or, in other words, the gear 74 cooperates with the teeth 72 of the ring gear 71 in providing a low speed while the gear 75 cooperating with the teeth 73 of the ring gear provides high speed. A clutch element 78 is splined on the power shaft 7 and may be alternately engaged with the clutch elements 76 and 77 to provide the high and low gear ratios to the transmission 6.

A reversing gear 79 is journaled on the power shaft 7 within the housing 69 and engages the teeth 72 of the ring gear 71 opposite to the engagement of the pinion 74 with said ring gear and is provided with a clutch element 80 which may be engaged and disengaged by a clutch element 81 splined on the power shaft. Operating rods 82 and 83 are slidably mounted in the housing 69 and are pivotally connected to pivotally mounted arms 84 and 85. The arm 84 is connected to the clutch element 78 and the arm 85 is pivotally connected to the clutch element 81. Further, it is to be understood yokes are provided between said clutch elements and the pivots employed in the connection of the arms 84 and 85 thereto. The operating rods 82 and 83 are adapted to be independently operated whereby the transmission 6 may be placed in either high or low gear or in reverse gear.

A locking device indicated in entirety by the character 86 is provided to prevent simultaneous movement of the operating rods 82 and 83 by the operator so that there will not be danger of putting the transmission in reverse gear should either the high or low gear ratios be in operation. The locking device 86 consists of a pivotally mounted lever 87, the ends of which are grooved to receive approximately one-half of the diameters of the operating rods 82 and 83 and said operating rods are provided with notches 88 which when opposite the grooved ends of the lever 87 will permit either one of the operating rods to receive sliding movement. However, whenever either of the operating rods is moved endwise the notch of said rod that is moved is positioned away from the grooved end of the locking lever so that said grooved end riding the rod will cause the other grooved end of the locking lever to move in the notch of the other operating rod and thereby prevent the latter named operating rod from being moved manually in an endwise direction.

A fluid reserve reservoir is indicated by the character 89 and pipes 90 and 91 provided with oppositely arranged check valves 92 connect with the chests 32 of the fluid drive unit 5 to maintain the latter supplied with fluid at all times.

In operation, with the prime mover of the vehicle in operation and the transmission 6 in gear, the rotor 40 of the unit 5 will be rotated and by the proper arrangement of the gates 37 the unit 5 may be made to drive the driven units 8 simultaneously and thereby deliver power to the wheels of the vehicle from the prime mover. The operator through the operation of the gates can at any time discontinue power to the wheels on one side of the vehicle while power is being delivered to the wheels on the other side of the vehicle. Further, it will be seen that it is possible for the operator to disrupt the fluid drive between the unit 5 and all of the the units 8 whenever desired. Also that the operator may, through the operation of the gates 37, bring about simultaneous braking action in a gradual manner on all of the wheels of the vehicle by moving the gates toward and into engagement with the seats 35. Such operations as described can be conveniently carried out by the operator by the controls provided for the purpose and further it will be seen that when the device in entirety is in the act of driving the wheels of the vehicle the power will be delivered to the wheels from the prime mover with extreme smoothness. Also the gates will permit the operator to vary the driving ratio between the unit 5 and the units 8, depending on how far the gates are moved away from the periphery of the rotor 40.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a fluid drive and control for a four-wheel-drive motor vehicle, a centralized and symmetrically arranged set of four separate and like fluid driven units arranged one unit in working relation to each vehicle wheel, the wheels rotated in correlated pairs at opposite sides of the vehicle and mounted on driving spindles respectively at the opposite ends of a front and a rear axle of the vehicle, flared angularly arranged, universally jointed, propeller shafts operatively connecting each fluid driven unit with the driving spindle of its correlated vehicle wheel, a fluid drive unit centralized between the aforesaid symmetrically arranged set of fluid driven units, said fluid drive unit having separate fluid conductive connections directly with the pairs of said fluid driven elements at each side of the vehicle, motive means for driving said fluid drive unit including a prime mover power shaft and a selectively operable connecting provision between said fluid drive unit and said prime mover power shaft for operating the fluid drive unit at different speeds, said selectively operable provision being also capable of reversely operating said fluid drive unit, and means for controlling emission and transfer of fluid from said fluid drive unit to said correlated pairs of fluid driven units whereby to selectively partially withhold emission and transfer of the fluid so that the drive unit operates with idling effect and whereby to also selectively vary the volume of flow and force of the fluid from the drive unit to the driven units, either to all four thereof simultaneously or to only one correlated pair thereof at a time, and by further selective manipulation of said controlling means effectively cut off completely the emission and transfer of fluid from said drive unit to all four of said driven units so as to prevent operation of the driven units and thereby cause a braking effect upon the vehicle wheels.

2. A fluid drive and control provision as set forth in claim 1, wherein the drive unit includes therein an opposed pair of controlling gate valves, the one correlated to the pair of driven units at one side of the vehicle and the other correlated to the pair of driven units at the other side of the vehicle, and the means for controlling the emission and transfer of the fluid from the drive unit to the driven units comprises a pair of selectively operable elements for operating either one of said pair of opposed gate valves for individual control of volume and force of the fluid emitted and transferred from the drive unit to the selective pair of driven units, and means associated with but selectively operable independently of said pair of individual controlling elements for actuating both of said gate valves simultaneously so as to regulate the volume and force of the fluid emitted and transferred from said drive unit to all four of the driven units simultaneously and to also completely cut off simultaneously emission and transfer of the fluid from the drive unit to all of the driven units so as to permit an idling operation of the drive unit and cause a braking effect on the vehicle wheels.

3. A fluid drive and control provision as set forth in claim 1, wherein the means for controlling the emission and transfer of the fluid from the drive unit to the driven units includes separate selectively operable elements for controlling individually the volume and force of the fluid emitted and transferred from the drive unit to either one of the correlated pairs of driven units selectively at the will of an operator and further including means associated with but selectively operable independently of said individually operable means for regulating the volume and force of the fluid emitted from said drive unit to all four of the driven units simultaneously and to also completely cut off simultaneously emission and transfer of fluid from the drive unit to all of the driven units so as to permit an idling operation of the drive unit and cause a braking effect on the vehicle wheels, said last-named selectively operable means having associated therewith a control provision whereby its operation to effect the braking action on the vehicle wheels is gradual to the completion thereof.

PASCUAL M. DIAZ.

REFERENCES CITED

The following references are of record in the file of this patent:

UNITED STATES PATENTS

| Number | Name | Date |
|---|---|---|
| 1,688,591 | Mitton | Oct. 23, 1928 |
| 2,228,411 | Sheridan | Jan. 14, 1941 |
| 656,834 | Blanchard | Aug. 28, 1900 |
| 1,639,961 | Petersen | Aug. 23, 1927 |
| 1,052,772 | Van Valkenburg | Feb. 11, 1913 |
| 1,319,176 | Pfahler | Oct. 21, 1919 |
| 1,481,578 | Wise | Jan. 22, 1924 |
| 181,981 | Polsley | Sept. 5, 1876 |
| 530,874 | Allen | Dec. 11, 1894 |
| 2,357,742 | Jeffrey | Sept. 5, 1944 |
| 1,189,042 | Beijer | June 27, 1916 |
| 2,355,604 | Rupp | Aug. 15, 1944 |
| 1,157,415 | Norton | Oct. 19, 1915 |
| 1,306,227 | Kane | June 10, 1919 |
| 2,394,160 | Emmitt | Feb. 5, 1919 |